United States Patent [19]

Fanti

[11] 4,095,878
[45] Jun. 20, 1978

[54] SOFT CONTACT LENS WITH FLATTENED REGION FOR AUTOMATIC ORIENTATION

[75] Inventor: Peter Fanti, Hamburg, Germany

[73] Assignee: Titmus Eurocon Kontaktlinsen GmbH & Co. KG, Aschaffenburg, Germany

[21] Appl. No.: 743,857

[22] Filed: Nov. 22, 1976

Related U.S. Application Data

[63] Continuation of Ser. No. 561,508, Mar. 24, 1975, abandoned.

[30] Foreign Application Priority Data

Mar. 28, 1974 Germany .............................. 2415108

[51] Int. Cl.² ................................................ G02B 5/23
[52] U.S. Cl. .................................................... 351/161
[58] Field of Search ................................. 351/160–162

[56] References Cited

U.S. PATENT DOCUMENTS

| 3,228,741 | 1/1966 | Becker | 351/160 |
| 3,238,676 | 3/1966 | Borish | 351/160 X |
| 3,660,545 | 5/1972 | Wichterle | 351/160 X |
| 3,698,802 | 10/1972 | Baron | 351/160 |
| 3,940,207 | 2/1976 | Barkdoll | 351/160 |

OTHER PUBLICATIONS

Jessen, Article in *American Journal of Optometry & Archives* Apr. 1969, pp. 308–311.

*Primary Examiner*—Conrad J. Clark
*Attorney, Agent, or Firm*—W. G. Fasse; W. W. Roberts

[57] ABSTRACT

A soft contact lens for use on the human eye formed from a soft material like silicon or a hydrophilic material. The lens has a generally spherical concave inner surface which conforms to the cornea and a generally convex outer surface. To maintain the correct orientation of the lens when placed on the eye it is provided with a flattened region along a portion of its periphery.

9 Claims, 6 Drawing Figures

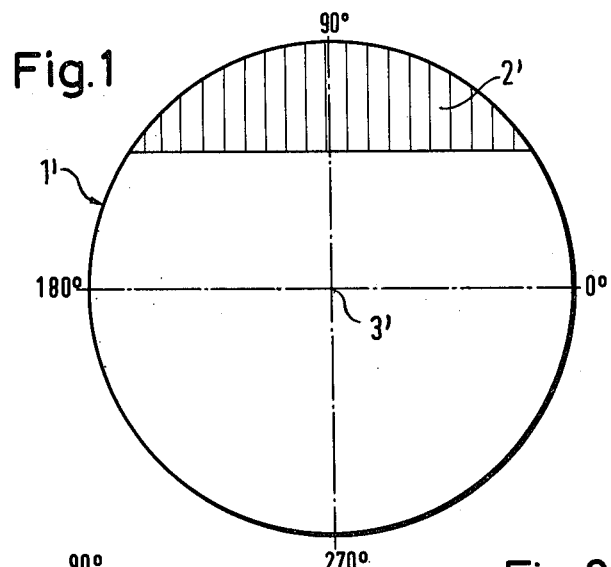
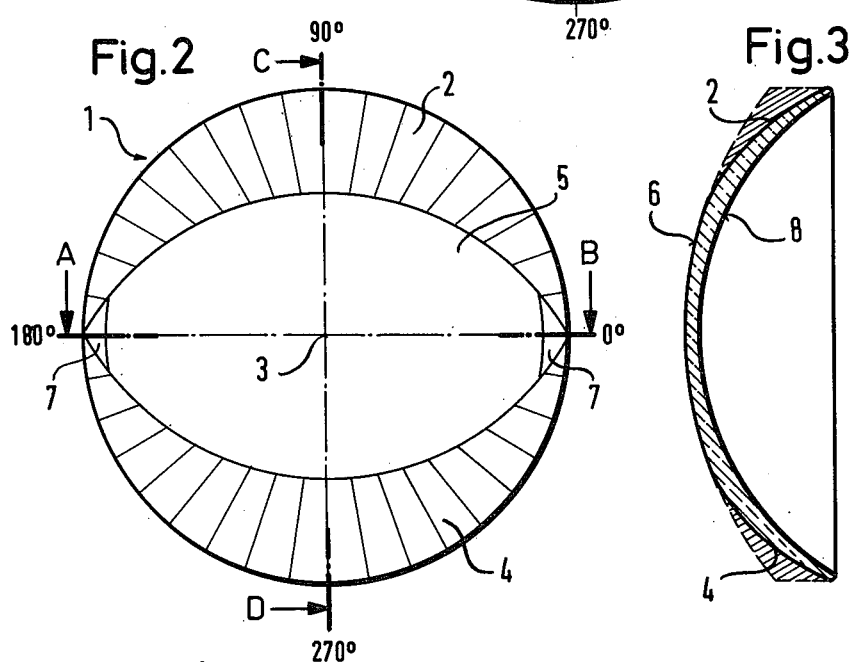
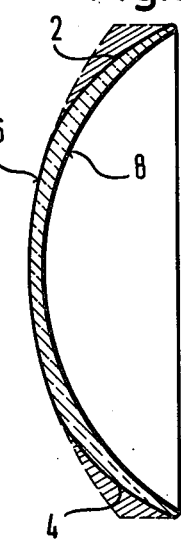
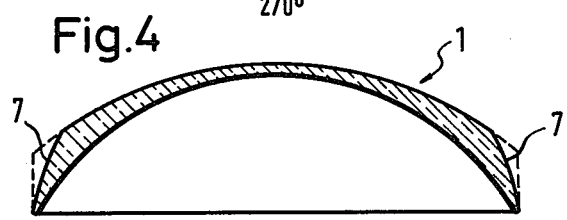

SOFT CONTACT LENS WITH FLATTENED REGION FOR AUTOMATIC ORIENTATION

REFERENCE TO RELATED APPLICATION

This application is a continuation application of co-pending Ser. No. 561,508; filed Mar. 24, 1975, now abandoned.

BACKGROUND OF THE INVENTION

This invention relates to soft contact lenses. Various types of soft contact lenses have been proposed. With these contact lenses however only spherical refractive errors can be corrected. In case of astigmatism or heterophorias, which are corrected by positioning the correcting element, i.e. glasses or contact lens, in a pre-determined orientation in front of or on the eye, these lenses may not be used as they can not be retained in the proper orientation.

It has been proposed to provide hard contact lenses with a prismatic weight or with another form of ballast in order to retain the lens by gravitational force in the pre-determined orientation. These hard lenses however can not be used to correct exophorias or esophorias.

SUMMARY OF THE INVENTION

It is the object of the present invention to provide a soft contact lens which will orient itself in a pre-determined position while it is worn.

It is a further object of the invention to provide a soft contact lens which can be used to correct astigmatism and heterophorias.

It is still another object of the invention to provide a soft bifocal contact lens.

A further object of the invention is to provide a lens which can be used to determine the inclination of the palpetral fissure.

According to the present invention this is achieved by flattening the lens along a portion of its peripheral region.

In a preferred embodiment of the invention a second flattened region is provided opposite to the first mentioned region and symmetrical to the center of the lens.

It is not the purpose of the flattened region to reduce the thickness of the wedge-shaped portion of a lens if this wedge of prism is used as a ballast to stabilize the lens by gravitation. It is known in the art to taper off prismatic or similar contact lenses which have an increased edge thickness for optical or geometrical reasons.

With the flattened region according to the present invention a different aim is pursued. Its object is to stabilize a soft contact lens, which may be symmetrical or asymmetrical to its axis of rotation, in a pre-determined orientation. This orientation is necessary if astigmatism, heterophorias or squinting are to be corrected.

Whenever a soft contact lens has to be oriented in a pre-determined position on the cornea this can be achieved by the dynamic stabilization effect caused by the present invention.

Further features and advantages of the invention are set forth in the following description of specific embodiments in connection with the accompanying drawings.

BRIEF DESCRIPTION OF THE DRAWINGS

FIG. 1 is a plan view of a corneal lens according to the present invention;

FIG. 2 is a plan view of a preferred embodiment of the invention;

FIG. 3 is a diagrammatic cross-section of the lens shown in FIG. 2 along the line C—D;

FIG. 4 is a cross-section of the lens shown in FIG. 2 along the line A—B;

DETAILED DESCRIPTION OF THE INVENTION

Figure 5:
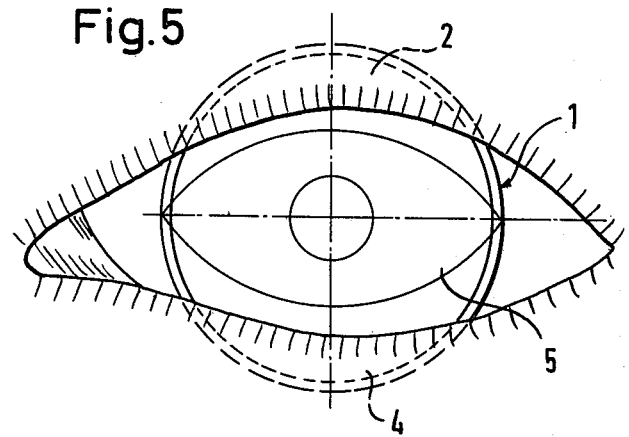
FIG. 5 is a view showing the lens placed on the eye.

The contact lens 1' shown in FIG. 1 is provided with a flattened region 2' on its upper periphery which is parallel to the line A—B and the 9 o'clock — 3 o'clock direction of the coordinate system.

FIG. 2 shows a preferred embodiment in which opposite to the region 2 a second flattened region 4 is provided. The boundary dividing this region from the optical center portion of the lens may be a circular arc as the boundary of region 2, it may be straight as shown in FIG. 1 or it may have an arbitrary shape. Different shapes of boundaries may be used on one lens.

FIG. 3 shows these flattened regions as compared with the shape of a prior art lens which is drawn in broken lines. The contact lens shown in solid lines is fabricated by taking off the material of the hatched portion in FIG. 3.

Due to the flattened regions 2, 4 on opposite sides of the lens the thickness along the edge of the lens will vary. It has a minimum thickness at the position 12 o'clock and 6 o'clock and increases in the direction of 9 o'clock and 3 o'clock. The points of maximum thickness should be at 9 o'clock and 3 o'clock.

If it should be necessary to taper off the zones at 7, 7' in FIG. 2, as may be the case with a high minus power lens, to improve the comfort of the wearer, the thickness of the edge in the regions 12 o'clock and 6 o'clock must still be less than the thickness in the regions 9 o'clock and 3 o'clock.

According to a preferred embodiment the regions 2 and 4 are provided on the outer surface 6 of the lens 1, i.e. not on the corneal surface.

The flattened regions may be produced by forming the lens blank on a lathe. If the contact lens is fabricated by molding or centrifugal molding the flattening must be part of the mold.

The diameter of the lens 1 is generally of a size dependent on the size of the cornea. This diameter must be large enough to make sure that the center region 5 is larger than the size of the pupil.

As shown in FIG. 5 the size of the flattened regions 2 and 4 is chosen so as to be covered by the lower and upper eyelid when the lens is inserted. The regions 2 and 4 should be as large as possible.

The shape of the lens may become oval when the regions 2 and 4 are flattened. This is not at all detrimental to the stabilization effect but might even further improve it.

When the lens 1 is placed on the cornea it will be rotated due to the pressure exerted by the eyelids until the thinner regions 2 and 4 are aligned in a 12 o'clock — 6 o'clock orientation as shown in FIG. 2. This dynamic stabilization causes the lens to orient itself on the cornea and to align the thinner regions in the orientation 12 o'clock — 6 o'clock and the thicker peripheral regions 7 in the orientation 9 o'clock — 3 o'clock parallel to the palpetral fissure (FIG. 5).

Figure 6:
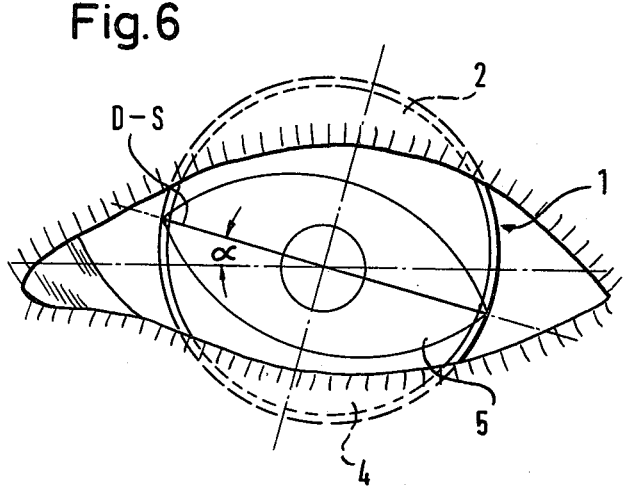
FIG. 6 is a lens for measuring the inclination.

The correct orientation of a soft contact lens according to the present invention depends on the blinking motion of the eyelids and the shape and position of the palpetral fissure. The symmetry axis of the two flattened regions may not always stabilize in a horizontal position on the cornea. The resulting deviation is called inclination (FIG. 6).

The amount $a$ of inclination can be measured by using a special lens provided for this purpose. The inclination is measured during the fitting procedure of the contact lens by the optometrist and used as a correction term.

An inclination does not impede the exact stabilization of the contact lens or the correction of the refractive error.

A contact lens used to measure the inclination is provided with two flattened regions according to the invention, and more over, the symmetry axis D—S of the two flattened regions is marked.

To measure the amount of inclination an ophtalmometer may be used, by adjusting it to the D—S marking. If the axis of this instrument is aligned with the symmetry markings on the lens a double image will be produced. By rotating the instrument head these images can be made to coincide and only one marking will be seen. The scale of the instrument now indicates the amount of inclination. There are two kinds of inclinations, a subtractive and an additive inclination.

In the case of a toric lens it is not necessary to orient the lens when placing it on the cornea. The soft lens will be rotated by the blinking of the eyelid and it will orient itself in a pre-determined position.

In the case of prismatic or bifocal or multifocal contact lenses it is only important that the lens is approximately oriented when placed on the cornea. The exact orientation is then accomplished by the blink. Therefore it is only necessary that the lens is placed on the cornea with the correct side up or down or to the right or the left.

As has been mentioned before, in case of astigmatism the lens has to be oriented on the cornea in a pre-determined position. For this purpose the lens is provided either with an inner or an outer toric surface having the necessary spherocylindrical power to correct the astigmatism. When this lens is placed on the cornea it will orient itself by the dynamic stabilization effect due to the flattened regions 2 and 4.

Usually a soft contact lens will adhere almost completely to the cornea thus transfering the existing astigmatism of the cornea to the front surface of the lens without correcting it.

Using a toric contact lens with dynamic stabilization according to the above mentioned embodiment, which is provided with a toric front and a toric inner surface, an exact correction can be achieved.

The soft lens according to the present invention is also useful for correcting heterophorias. In this case care has to be taken to correctly orient the base of correcting prism.

The reference axis is the 9 o'clock — 3 o'clock axis again which will balance itself parallel to the eyelids. The same happens with bifocal or multifocal lenses.

To fabricate the above mentioned soft contact lens all materials known for this purpose may be used, as for instance silicon or hydrophilic materials.

While there have been illustrated and described several embodiments of the present invention as well as methods of making the parts which comprise the invention, it will be understood that various changes and modifications may occur to those skilled in the art. It is intended to cover all modifications and equivalents within the scope of the appended claims.

What is claimed is:

1. A soft contact lens adapted to the cornea comprising a lens body with a generally spherical concave inner surface and a generally convex outer surface, said lens body having a central horizontal axis, said outer surface having a flattened region along at least one portion of its periphery on said convex outer surface, said flattened region extending substantially in parallel to said central horizontal axis, the thickness of said lens increasing continually in said flattened region in the direction toward the optical center of said lens and said flattened region, on each circumferential line thereof, having one point of minimum thickness from which said thickness increases in both directions along said circumferential line, whereby said flattened region cooperates with eyelid movement of a user to automatically orient said lens and to maintain a horizontal orientation of said central horizontal axis.

2. A soft contact lens as claimed in claim 1, in which a second flattened region (4) is provided substantially symmetrical to the center of the lens and opposite to the first region.

3. A soft contact lens as claimed in claim 2, in which the lens is provided with a toric inner or outer surface.

4. A soft contact lens as claimed in claim 2, in which the lens is a bifocal lens.

5. A soft contact lens as claimed in claim 2, in which the lens is provided with a prism.

6. A soft contact lens as claimed in claim 2, in which the lens has a pre-determined axis, said flattened regions being provided at right angles to the nine o'clock — three o'clock axis.

7. A soft contact lens as claimed in claim 2, in which the edge is thicker in a pre-determined 9 o'clock — 3 o'clock orientation than in a 12 o'clock — 6 o'clock orientation.

8. A soft contact lens as claimed in claim 2, in which the flattened regions are crescent-shaped.

9. A soft contact lens as claimed in claim 2, in which the lens is provided with additional markings to indicate the symmetry axis of the two flattened regions.

* * * * *